United States Patent [19]

Franko-Filipasic et al.

[11] 3,994,996
[45] Nov. 30, 1976

[54] POLYMERIC PHOSPHAZENES AND PROCESS FOR PREPARATION

[75] Inventors: Borivoj Richard Franko-Filipasic, Morrisville; Edward F. Orwoll, Langhorne, both of Pa.; Vithal C. Patel, Glen Burnie, Md.

[73] Assignee: FMC Corporation, Philadelphia, Pa.

[22] Filed: Apr. 5, 1974

[21] Appl. No.: 458,102

Related U.S. Application Data

[62] Division of Ser. No. 225,621, Feb. 11, 1972, Pat. No. 3,845,167.

[52] U.S. Cl. .............................. 260/927 N; 260/973
[51] Int. Cl.² .................... C07F 9/06; C09K 3/28
[58] Field of Search ............... 106/15 FP, 148, 177; 260/927 N, 2 P, 973

[56] References Cited
UNITED STATES PATENTS

| | | | |
|---|---|---|---|
| 3,419,504 | 12/1968 | Klender | 260/927 N X |
| 3,459,838 | 8/1969 | Klender | 260/927 N X |

*Primary Examiner*—Anton H. Sutto

[57] ABSTRACT

A new class of polymeric phosphazenes with P—O—P oxygen linkages useful in rendering rayon flame retardant are prepared through the condensation of alkyl esters of phosphorus acids with acid halides of phosphorus acids with elimination of alkyl halides.

15 Claims, No Drawings

POLYMERIC PHOSPHAZENES AND PROCESS FOR PREPARATION

This is a division of application Ser. No. 225,621, filed Feb. 11, 1972, now U.S. Pat. No. 3,845,167.

This invention relates to a process for preparing polymeric phosphazenes by formation of P—O—P oxygen linkages through the condensation of alkyl esters of phosphorus acids with acid halides of phosphorus acids with elimination of alkyl halides; the polymeric phosphazene composition so obtained; and regenerated cellulose filaments and filamentary articles which are made permanently flame retardant by having dispersed therein a flame-retardant amount of these substantially water-insoluble liquid polymeric phosphazenes.

It is desirable, for many textile purposes to provide cellulose fibers and yarns having greatly decreased flammability. In the manufacture of rayon by the viscose method, it has been proposed to add various flame-retardant chemicals to the viscose prior to spinning. This approach presents many additional problems because of the particular chemistry of the viscose process. Accordingly, the flame retardant must be stable and inert with respect to the highly alkaline viscose and also with respect to the acid regeneration bath into which the viscose is extruded. It must not be extracted during spinning and processing. Furthermore, the added material must not interfere with the spinning process, for example, cause clogging of the spinnerets.

Rayon has been made permanently flame retardant by dispersing in the rayon a flame-retardant amount of a substantially water-insoluble, liquid phosphonitrilate polymer as disclosed by Godfrey in U.S. Pat. Nos. 3,455,713, 3,505,087 and 3,532,526, respectively, issued July 15, 1969, Apr. 7, 1970 and Oct. 6, 1970. Although the Godfrey compositions do not seriously degrade rayon fiber properties, it is always desirable to have more effective flame retardants allowing attainment of adequate flame retardance at a lower additive level with a consequent lowered impairment of physical properties of the rayon fibers and a decrease in cost.

In accordance with the present invention, there is provided a novel class of liquid polymeric phosphazenes which, when dispersed in regenerated cellulose, make the regenerated cellulose highly flame resistant. The phosphazene units are randomly linked together by an oxygen bridge connecting phosphorus atoms of neighboring units.

These novel liquid polymeric phosphazenes include mixtures resulting from the condensation of a phosphonitrilate, represented by the general formula:

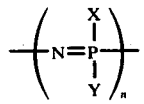

with an acid halide of a phosphorus acid such as a phosphonitrilic chloride with elimination of an alkyl halide, in which general formula X and Y represent the same or different substituents including —OR groups wherein R is aliphatic, cycloaliphatic, aromatic or heterocyclic, said aliphatic radical being straight or branch chained and having 1 to 12 carbon atoms, preferably R is an alkyl or alkenyl radical having from 2 to 6 carbon atoms, said cycloaliphatic radicals have 4 to 6 carbon atoms and said aromatic radicals have 6 to 10 carbon atoms; R may also have substituent groups including halogens, ether or amino groups. X and Y can also be —SR wherein R is as previously described. Some of the X and Y substituents can remain halogens from the phosphonitrilic halide polymer from which the ester was derived. Usually, the halogen is chlorine. X and Y substituents also include —NR$_1$R$_2$ wherein R$_1$ is hydrogen and R$_2$ is a lower aliphatic group, or R$_1$ and R$_2$ are lower aliphatic, cycloaliphatic or aromatic groups as described for R above or together R$_1$, R$_2$ and —N form a 5 or 6 membered nitrogen-containing heterocyclic group. The $n$ in the above general formula is an integer of at least 3 for cyclic oligomers. The flame-retardant material must be a pumpable fluid in accordance with this invention, thus $n$ on an average must be low enough to meet this requirement. In a preferred embodiment of this invention R and R' are ethyl, n-propyl, isopropyl or allyl radicals since polymers wherein both R and R' have fewer carbon atoms tend to be more water soluble, whereas the presence of more carbon atoms provide products having a lower phosphorus content thereby reducing their effectiveness as flame retardants. This can be overcome, of course, by using polymers wherein R contains fewer carbons and R' contains more. For example, R is methyl or ethyl and R' is butyl, amyl, isomyl, or hexyl.

These novel polymeric phosphazenes are formed by linking lower molecular weight cyclic and/or linear oligomers containing at least 3 units having the structure:

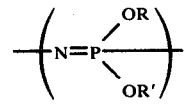

by means of P—O—P oxygen linkages. Typical compounds result from the condensation of alkyl esters of phosphorus acids with acid halides of phosphorus acids with elimination of alkyl halides. Typical alkyl esters are linear and/or cyclic oligomers having the general structure:

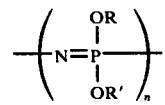

wherein $n$ is at least 3 and is substantially 3 to 6 for cyclic oligomers, all well known in phosphonitrilic chloride chemistry. These cyclic or linear oligomers or mixtures of cyclic and linear oligomers can be reacted with, for instance, an acid halide of a phosphorus acid of the general formula POX$_3$' and PSX$_3$', where X' is a halide, to produce a mixture of desired compounds, one of which is exemplified by Compound I,

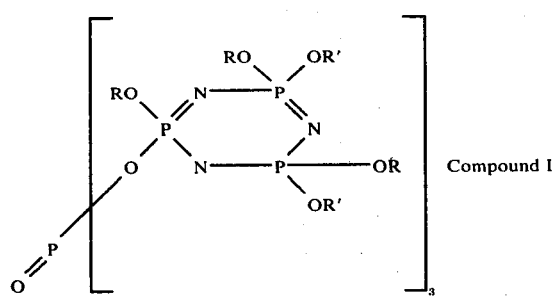

Compound I when the acid halide was $POX_3'$. The compositions of the invention can also be made by reacting cyclic oligomers having the structure:

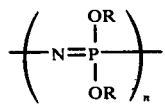

wherein $n$ is at least 3 with phosphonitrilic chloride oligomers having the structure:

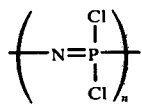

wherein $n$ is at least 3; when $n$ is 3 in both the ester and phosphonitrilic chloride and three ester groups are reacted with one phosphonitrilic chloride amount, the reaction produces a mixture including the structure:

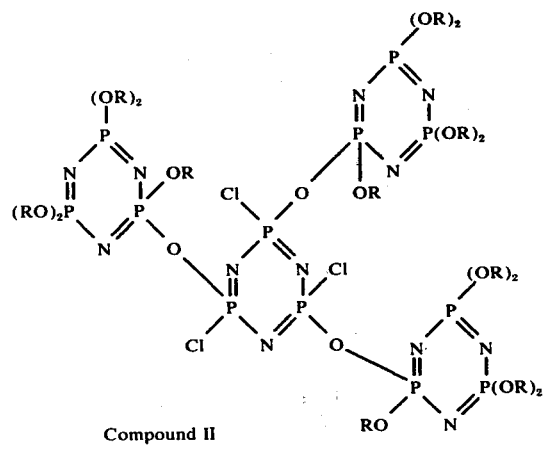

Compound II

For convenience, the formulation:

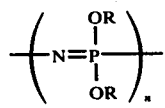

is used to denote both cyclic and linear analogs where R is as defined above. It is understood that the latter are more correctly formulated as

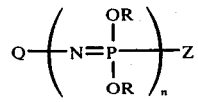

where Q and Z represent end capping groups. In the linear oligomers $n$ is 2 or more. For instance, Z may be —OR while Q may be

end caps. Similarly, for linear phosphonitrilic chlorides,

$Z'$ may be Cl while $Q'$ may be $—PCl_3^+ PCl_6^-$ or $—PCl_3^+ Cl^-$ or

While $n$ is generally at least 3 for linear as well as for cyclic analogs, some small proportion of the linear fraction may contain components wherein $n$ is less than 3.

Compound II is pictured with three residual chlorine atoms. Further reaction may be forced with elimination of more chlorine as alkyl chloride; however, chlorine is not completely exhausted under ordinary reaction conditions when phosphonitrilic chloride is used as the acid halide of a phosphorus acid. Esters of lower alkyl groups, those containing 1 to 6 carbon atoms are preferred in the phosphazenes of this invention. Generally, alkyl groups containing 1 to 3 carbon atoms are most preferred since higher homologs or aromatic esters increase the C:P proportion excessively to the detriment of flame retardance.

The phosphazenes of this invention are generally complex mixtures of varying molecular weight and chain length. Chain length or molecular complexity is not limited, except to the extent of causing excessive viscosity. Very high viscosity compositions, that is, having viscosities of 500 poises and above, can be used; if they are too viscous to be pumped, metered and mixed in ordinary processing equipment, the high viscosity materials can be softened with water-insoluble organic solvents.

Flame retardancy is proportional to the proportion of flame retardant retained by the fiber, but strength and other desirable physical properties of the fiber vary inversely with the proportion of retardant. Surprisingly, compounds of this invention are inherently highly effective flame retardants, allowing attainment of adequate flame retardance at low levels with consequent decrease in cost and improvement of physical properties of the regenerated fibers, as compared to prior art compositions. These new phosphazene compositions also possess increased viscosity which tends to improve the retention within the fiber during the regeneration process. The phosphazenes of this invention are typically made by reacting linear and cyclic oligomers

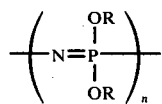

and mixtures thereof where $n$ is at least 3 with $PX_3'$, $POX_3'$ or $PSX_3'$ where $X'$ is a halide or with cyclic or linear phosphonitrilic halide oligomer such as:

where $n$ is at least 3 and $X'$ is chlorine or bromine.

Alternatively, a partially esterified chlorophosphazene is forced into self-condensation with elimination of alkyl chloride. This can be achieved by partial esterification, followed by a thermal bodying reaction with elimination of alkyl chloride as exemplified in Example 4. Cross-linking, to a greater degree than that pictured in Compound II can be forced.

The amount of polymeric phosphazene flame retardant of this invention which is dispersed in regenerated cellulose filament to provide a proper balance between flame retardancy and fiber properties varies from about 1 to about 25% and preferably 2 to 18% based on the weight of the filament.

The flame-retardant compounds of this invention are incorporated into regenerated cellulose filaments by any of the known methods for preparation of such filaments. While the viscose method is preferred, the flame-retardant compounds can be incorporated in cellulosic solutions, spun into filaments and the cellulose regenerated. Thus, the cuprammonium method and the deesterification of a cellulose ester method can be utilized to prepare regenerated cellulose filaments having the flame-retardant compounds incorporated therein.

One embodiment of this invention comprises incorporating the above-described liquid polymeric phosphazene in a viscose solution and spinning the viscose in the shape of one or more filaments into a coagulating and regenerating medium. The formed filaments are aftertreated using techniques well known in the rayon field to provide continuous filaments, fibers and yarn, as well as staple fibers. These may then be used to prepare any known textile article in which the flame-retardant property is desirable.

The flame-retardant polymeric phosphazene of this invention is a liquid of pumpable consistency which is preferably used as a crude reaction product, prepared, for example, in a known manner by the conversion of the corresponding polymeric phosphonitrilic chlorides to the specified esters; or in a washed, decolorized or otherwise refined state. If desired, suitable solutions of the polymeric phosphazene may also be prepared and used for incorporation in viscose.

In a preferred embodiment of the method of this invention, a controlled amount of the flame-retardant phosphonitrilate is injected into the viscose just prior to its extrusion through the spinnerets. The viscose is extruded into an acid bath and processed in a conventional manner.

In a simple example, the invention involves the condensation of hexapropyl cyclotriphosphazatriene with a phosphorus acid halide exemplified by $POCl_3$ which is illustrated by the following reaction sequence:

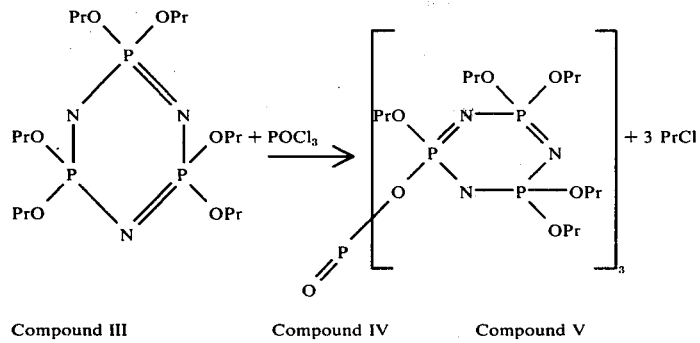

Compound III     Compound IV     Compound V where Pr is used as an abbreviation for propyl.

Possible permutations are endless, both in the analogs which can be substituted for Compounds III and IV and in the reactant ratio of Compounds III and IV which can affect average molecular weight and degree of crosslinking. Practical limits are imposed by cost and by the need for a product having a reasonable liquid viscosity of 100 to 50,000 centipoises, preferably 500 to 5,000, as special equipment is required to pump and handle the higher viscosity materials.

Compound III can be the cyclic trimer ester as represented, or a mixture of cyclic oligomers where $n$ is 3 to 14; or a mixture of cyclic and linear polymers as is well known in phosphonitrilic chemistry.

Compound IV can be $PCl_3$, $PBr_3$, $POCl_3$, $PSCl_3$, $PSBr_3$, $POBr_3$ and so forth though chlorides are preferred; Compound IV could be replaced by a phosphonitrilic halide, which again could be a single compound or a mixture of cyclic and/or linear oligomers. The desired polymeric products could also be prepared by the self-condensation of partially esterified chlorophosphazenes through the elimination of alkyl chloride. The common feature of the polymerizing reaction is formation of P—O—P linkages and the elimination of alkyl halide.

The intermediate esters, such as Compound III, are prepared by esterifying chlorophosphazenes with alcohols in the presence of tertiary amine acid acceptors, or with sodium alkoxides, or by the reaction with alkylene oxides, all of which are well-known reactions. The alkyl and/or chloroalkyl groups preferably contain 1, 2 or 3 carbon atoms. Higher alkyl groups may be used but result in inferior flame-retarding agents. For reasons of economy, chlorine is the preferred halogen.

The reaction between the ester and acid halide groups with elimination of alkyl halide can proceed with or without solvent. The relative ratio between ester and acid halide components can vary widely because of the many reactant options available. In practice, reactant ratios are limited since preferred compositions retain less than 1.5% halide, preferably chlorine, and are less than 200 poises in viscosity at 25° C.

The reaction between the ester and halide components proceeds at 50° to 200° C., with considerable variability in the reactivity of the halide component. The reaction may be conducted batchwise or continuously. Phosphorus oxychloride reacts more readily and at a lower temperature than the mixed lower cyclic phosphonitrilic chlorides, and reacts more completely with respect to exhaustion of residual chlorine. reaction rates are uneconomically slow at the lower end of the temperature range; discoloration and competitive decomposition reactions ensue at the upper end. The preferred temperature range is therefore 100° to 150° C.

As the reaction between ester and halide component proceeds, low boiling alkyl chloride is eliminated. Atmospheric or reduced pressure in the range of 5 to 760 mm of mercury pressure is preferred to promote removal of the alkyl chloride. Superatmospheric pressures may be used; for example, to facilitate condensation of the alkyl chloride.

Depending upon choice of reactants, the reaction time varies generally from 4 to 12 hours at the preferred temperature range. Reaction proceeds more rapidly at higher temperatures along with discoloration and decomposition reactions. Optimum time-temperature conditions must be found for each reactant composition. Time may be further extended if a particularly low halogen content or a higher viscosity is desired. Often, it is convenient to let a reaction proceed for 24 to 36 hours and longer, especially when low reaction temperatures are selected.

The reaction may be run in inert solvents (diluents) preferably chosen to reflux at the desired reaction temperature, for example, octane or chlorobenzene. A solvent from which byproduct alkyl chloride is easily separated is desired. When a low-boiling solvent is chosen, pressure sufficient to achieve a desired reaction temperature is used. When the reaction is run without solvent, it is expedient to pass a slow stream of inert gas, such as $N_2$, through the reaction mixture to sweep out alkyl chloride. The extent of reaction can be monitored by measurement of alkyl chloride evolved or analysis for residual chloride.

No unusual equipment is required. A standard reactor equipped with devices for metering, agitating, heating, cooling, refluxing and distilling is applicable.

Although the reaction proceeds without catalyst, the reaction rate is materially increased by the presence of an active copper powder catalyst. The use of catalyst, such as copper, reduces time and temperature required, and decreases the extent of discoloration and decomposition reactions.

The following examples further illustrate the invention. All proportions in the examples and the specification are by weight unless otherwise indicated.

EXAMPLE 1

A mixture of 1255.7 g. (7.7 moles;

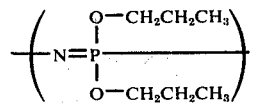

unit as one mole) polymeric propyl phosphonitrilate derived from a mixed cyclic phosphonitrilic chloride (PNC, 60% trimer) and 144.3 g. (1.24 moles;

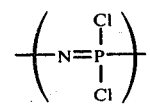

unit as one mole) polymeric cyclic phosphonitrilic chloride (PNC, predominately trimer) was gradually heated in 50 minutes to 120° C. in a two-liter, three-neck reaction flask equipped with a mechanical stirrer, nitrogen tube, thermometer, and Dean-Stark trap equipped with a Dry Ice Condenser. The reaction mixture was stirred at 120° C. for 150 minutes with a slow current of $N_2$ passing through the liquid, during which time 101 g. (1.29 moles) of propyl chloride, a by-product, was collected in the Dean-Stark trap. The reaction temperature was then gradually raised to 140° C. in an additional 110 minutes and stirred at that temperature for an additional 60 minutes to give 1134 g. of reaction product as a residue in the reaction flask and a total of 150 g. (1.92 moles; 77.5% yield of n-propyl chloride, based on PNC charge) of propyl chloride. The product analysis results are given in table 1. The viscosity of the starting propyl phosphonitrilate was 45 centipoises at 25° C.

EXAMPLE 2

Example 1 was repeated at controlled reaction conditions of 250 minutes at 140° C., followed by 30 minutes at 120° C. to obtain a product with the viscosity of 5800 centipoises. The propyl chloride yield was 158.1 g. (2.02 moles, 79.3% propyl chloride yield based on PNC charge). The analyses on the product, 1216 g., are given in table 1.

EXAMPLE 3

A mixture of 1173.6 g. (7.2 moles;

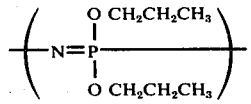

unit as one mole) polymeric propyl phosphonitrilate and 122.8 g. (0.8 mole) of phosphorus oxychloride was gradually heated to 105° C. in 60 minutes, in a two-liter, three-neck reaction flask equipped with a mechanical stirrer, nitrogen tube, thermometer, and Dean-Stark trap equipped with Dry Ice Condenser. The reaction mixture was stirred at 105° to 107° C for 165 minutes during which 166 g. of propyl chloride (2.12 moles; 88.1% yield) was collected in the Dean-Stark trap. The reaction temperature was further raised to 120° C in 45 minutes and held for an additional 90 minutes to give 1112 g. of reaction product as a residue in the reaction flask and a total of 184 g. of propyl chloride (2.35 moles; 97.5% propyl chloride yield on POCl₃ charge). The product analysis results are given in table 1.

There is no convenient method for analyzing for P—O—P oxygen. Each molecule of alkyl chloride formed, however, theoretically generates one such oxygen atom, defined as "P—O—P oxygen." The theoretical "P—O—P oxygen" content of Examples 1, 2, and 3 are calculated and reported in table 1.

Comparison of Examples 1 and 2 nominally shows a big increase in viscosity with no change in P—O—P oxygen, although hydrolyzable chloride decreases in the expected direction. Near the end of the process, viscosity apparently increases rapidly with very small increments of alkyl chloride being eliminated, although the possibility of concurrent polymerization by other mechanisms cannot be discounted.

EXAMPLE 4

To a suspension of 65.6 g. (0.8 mole) of sodium propoxide in a mixture of about 150 g. of octane and 6 g. of n-propanol at 110°–115° C. was added 212 g. of 28.86% (0.53 mole PNC; 32.5% excess stoichiometrically) solution of cyclic PNC in chlorobenzene in 2 hours. The resulting reaction mixture was refluxed for an additional 2 hours.

Solids, mostly sodium chloride, were filtered off from the remaining reaction mixture and then the solvents were distilled off by gradually raising the filtrate temperature to 140° C. The resulting reaction product was then held at 140° C. for 2 hours during which additional distillate, mostly byproduct propyl chloride, was removed. The resulting pot content was refined by washing with dilute aqueous sulfuric acid and sodium bicarbonate solutions and drying to yield very viscous bodied ester, with an estimated viscosity of 200 poise at 25° C. Ester produced by normal processing with a slight excess of sodium propoxide generally has a viscosity of 45–50 cps. at 25° C.

EXAMPLE 5

Example 1 was repeated on 200 g. (1.225 moles; (n–PrO)₂P=N— unit as one mole) scale of polymeric propyl phosphonitrilate with 23 g. (0.2M) of phosphonitrilic chloride using 2.2 g. of freshly prepared copper powder as a catalyst.

Based on the amount of propyl chloride evolved, 95% of the PNC charged reacted in the case of the catalyzed reaction (C3749–78–1) versus 86% for the uncatalyzed reaction under the same reaction conditions. The product from the catalyzed reaction had a viscosity of 12,400 cps. at 25° C., and $n_D^{25}$, 1.4765.

EXAMPLE 6

A mixture of 350 g. of polymeric propyl phosphonitrilate derived from mixed cyclic PNC (2.15 moles, (PrO)₂P=N unit as 1 mole) and 30 g. (0.218 mole) of phosphorus trichloride was gradually heated in 75 minutes to 130° C. in a 500-ml. reaction flask equipped with stirrer, thermometer, nitrogen tube and Dean-Stark trap equipped with a Dry Ice condenser. A slow current of nitrogen was passed through the reaction flask during heating. Propyl chloride, a byproduct, along with some volatiles, started to evolve at 105° C. and the theoretical amount was collected as a distillate in the Dean-Stark trap by the time the temperature reached 130° C.

The product was a viscous amber oil (viscosity, 1150 centipoises at 25° C.) with a refractive index of 1.4720 at 25° C.

EXAMPLE 7

The phosphorus-containing products of Examples 1 to 3 and the flame-retardant compound described in the Example of the Godfrey U.S. Pat. No. 3,455,713 were evaluated for their flame-retardant effect in rayon yarn produced from a filament-forming viscose comprising 8.6 wt.% cellulose, 6.2 wt.% sodium hydroxide and 33.0% carbon disulfide, based on the weight of the cellulose, and having a viscosity at spinning of 6000 centipoises at 18° C. The phosphorus-containing flame-retardant compounds were injected into the viscose stream at the desired rate based on the weight of the cellulose in the viscose and the viscose mixture passed through a high shear blender. This provided a viscose having the flame retardant dispersed therein as fine liquid particles of from 1 to 10 microns in size.

Viscoses prepared as described above and containing deliberately varied amounts of the phosphorus-containing flame-retardant compounds were spun into conventional aqueous acid spin baths comprising 9.8 wt.% sulfuric acid, 3.0 wt.% zinc sulfate and 17.5 wt.% sodium sulfate at a bath temperature of 50° C. The yarn was wet stretched about 35% of its original length. Yarns having a denier of 240 and 40 filaments were processed by passing them through a series of baths including water wash, desulfurization, bleach, bleach acid, antichlor, and soft finish bath. The yarns were dried, transferred to packages, and finally knit into circular knit fabrics. The regenerated cellulose yarns prepared in this manner were made up of individual filaments having fine liquid flame-retardant particles locked in the cellulose matrix.

Assays of the flame retardant in the fabrics were made by determining the phosphorus content of the neat flame retardants and the fabrics.

Table II sets forth the amount of phosphorus found in the particular flame-retardant compound used, the weight amount of flame retardant in the conditioned fabric, the weight amount of phosphorus in the dry regenerated cellulose fabric, and the percent phosphorus in the liquid polymeric phosphazene flame-retardant compositions. The amount of phosphorus in the dry fabric was used to calculate the amount of flame retardant present in the conditioned fabric. The control flame retardant was that described in the Example of U.S. Pat. No. 3,455,713 and consisted of a liquid mixture of di-n-propyl phosphonitrilate polymers including about 65% trimer, 15% tetramer, between about 15 and 20% of higher cyclic polymers and less than about 5% of linear polymers.

Flammability testing was made by employing the (1) Limited Oxygen Index (LOI) method and (2) the Vertical Strip Test AATCC34–1969.

The LOI test is made by supporting a 3×8 inches conditioned fabric sample in a U shaped frame which is mounted in a cylindrical open chamber. Controlled mixtures of oxygen and nitrogen gases are admitted into the base of the chamber and allowed to displace the normal atmosphere. when an equilibrium atmosphere in the chamber is obtained, the fabric sample is ignited with a butane gas flame by contacting the flame to the top edge of the fabric. If the fabric fails to ignite, the oxygen ratio of the atmosphere is increased to a level where the flame will just propagate. Conversely, if the fabric ignites and the flame propagates, the oxygen ratio of the atmosphere is reduced to a level where flame propagation is virtually zero. The LOI is the minimum percentage concentration of the oxygen atmosphere in which the test fabric will ignite and permit flame propagation. A control rayon fabric has an LOI of 18.5.

The vertical strip test is made by supporting a 3×10 inches fabric sample in a U shaped frame which exposes 2×10 inches fabric. The sample and frame is supported vertically in a draft-free chamber with the open end of the fabric frame pointed down. Ignition of the fabric is made with a Tirrell Burner fueld with butane. A 1½ inches long flame is aligned to the base of the fabric so that ¾ inch of the flame bites into the fabric. Flame contact time is for (a) 3 seconds and (b) 12 seconds. Data are obtained to show the length of the char and the time of after flame.

Table III sets forth the results of the above described flammability tests carried out on the fabric samples as defined for Table II. It should be borne in mind that the tests were made using knitted fabrics of relatively light construction. The verticle flame-retardant test results are useful for a relative appraisal of the fabrics tested as this test is greatly affected by fabric weight. In the verticle test, five samples are tested, the average char length must be less than 7 inches to pass and one char of 10 inches fails the test.

The limited oxygen test data has greater relevance to the flammability of normal apparel weight fabrics since the limited oxygen indices are not dependent on fabric weight.

Table I

| | Analysis on Reaction Products (Examples 1–3) | | |
|---|---|---|---|
| Example | 1 | 2 | 3 |
| Viscosity, cps. at 25° C | 2168 | 5800 | 1070 |
| Hydrolyzable chloride, % | 1.0 | 0.45 | 0.11 |
| Refractive Index $n_D^{25}$ | 1.4740 | 1.4752 | 1.4676 |
| Average Molecular Weight | 1034 | 1155 | 1014 |
| P-O-P Oxygen, % (Calculated) | 2.7 | 2.7 | 3.4 |

Table II

| Flame Retardant, (FR) | % Phosphorus in FR | Fabric Sample No. | % FR in Conditioned Fabric | % Phosphorus in Dry Fabric |
|---|---|---|---|---|
| Product of Example 1 | 22.6 | 1 | 7.1 | 1.76 |
| | | 2 | 9.0 | 2.22 |
| | | 3 | 12.2 | 3.05 |
| Product of Example 2 | 22.6 | 1 | 8.4 | 2.08 |
| | | 2 | 9.9 | 2.43 |
| | | 3 | 11.2 | 2.76 |
| Product of Example 3 | 21.7 | 1 | 7.9 | 1.91 |
| | | 2 | 9.3 | 2.23 |
| | | 3 | 11.2 | 2.65 |
| Control | 19.0 | 1 | 5.0 | 0.98 |
| | | 2 | 9.9 | 2.11 |
| | | 3 | 11.0 | 2.3 |
| | | 4 | 14.1 | 2.9 |
| | | 5 | 16.9 | 3.5 |
| | | 6 | 21.0 | 4.3 |

Table III

| Flame Retardant, (FR) | Fabric Sample No. | % FR in Conditioned Fabric | Limited Oxygen Index Test | Vertical Flame Test | | | |
|---|---|---|---|---|---|---|---|
| | | | | 3 Sec. | | 12 Sec. | |
| | | | | Char Length, In.* | After Flame, Sec. | Char Length, In. | After Flame, Sec. |
| Product of Example 1 | 1 | 7.1 | 26.2 | 10 | 15 | 8 | NAF-2 |
| | 2 | 9.0 | 26.6 | 9 | 1 | 7 | NAF |
| | 3 | 12.2 | 27.5 | 3 | NAF**-2 | 6 | NAF |
| Product of Example 2 | 1 | 8.4 | 25.1 | 10 | 14 | 10 | NAF-4.5 |
| | 2 | 9.9 | 26.5 | 5–10 | 4–19 | 6–10 | NAF |
| | 3 | 11.2 | 26.7 | 2–10 | NAF-8 | 6 | NAF |
| Product of Example 3 | 1 | 7.9 | 25.0 | 10 | 13.8 | 10 | NAF |
| | 2 | 9.3 | 26.3 | 6.3–10 | 8–17 | 5.4–10 | NAF |
| | 3 | 11.2 | 26.7 | 5.8–10 | 4.3–19.5 | 4.7 | NAF |
| Control | 1 | 5.0 | 23.8 | 10 | 18 | 10 | 7 |
| | 2 | 9.9 | 25.7 | 10 | 17 | 9 | NAF-5 |
| | 3 | 11.0 | 24.7 | 10 | 17.2 | 9 | NAF-7.7 |
| | 4 | 14.1 | 25.3 | 9 | 13 | 5.6 | NAF |
| | 5 | 16.9 | 26.0 | 3 | NAF-4.5 | 5.2 | NAF |
| | 6 | 21.0 | 26.3 | 1.9 | NAF | 5.2 | NAF |

*Over 7 inches fails in the three second test.
**NO AFTER FLAME

What is claimed is:

1. A process for the preparation of substantially water-insoluble liquid polymeric phosphazenes comprising the self-reaction at a temperature between 50° and 200° C of compounds having the general formula:

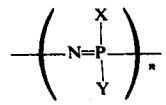

representing both cyclic and linear oligomers, in which $n$ is at least 3 for cyclic oligomers and wherein X and Y represent the same or different substituents including —OR groups wherein R is cycloaliphatic or aromatic radicals, the cycloaliphatic radicals having 4 to 6 carbon atoms and the aromatic radicals having 6 to 10 carbon atoms, said cycloaliphatic or aromatic radicals being halo-, ether- or amino-substituted or unsubstituted, and halogen groups wherein the halogen is chlorine or bromine and in which 10 to 90 mol percent of the X and Y substituents are halogen whereby there is a concomitant increase in the weight percentage of phosphorus in the polymeric phosphazene product.

2. The process of claim 1 in which the temperature is 100° to 150° C.

3. The process of claim 1 in which the reaction period is up to 36 hours.

4. The process of claim 1 in which a catalytic amount of copper metal is added to the reaction mixture.

5. A liquid polymeric phosphazene produced according to the process of claim 1.

6. A process for the preparation of substantially water-insoluble liquid polymeric phosphazenes comprising the self-reaction at a temperature between 50° to 200° C of compounds having the general formula:

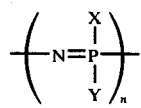

representing both cyclic and linear oligomers, in which $n$ is at least 3 for cyclic oligomers and wherein X and Y represent the same or different —OR groups wherein R is alkyl or alkenyl having 1 to 12 carbon atoms, said alkyl or alkenyl being halo-, ether or amino- or unsubstituted, and halogen groups wherein the halogen is chlorine or bromine and in which 10 to 90 mol percent of the X and Y substituents are halogen whereby there is a concomitant increase in the weight percentage of phosphorus in the polymeric phosphazene product.

7. The process of claim 6 in which R is an alkyl or alkenyl radical having from 2 to 6 carbon atoms.

8. The process of claim 6 in which the temperature is 100° to 150° C.

9. The process of claim 6 in which the reaction period is up to 36 hours.

10. The process of claim 6 in which the reaction is conducted in 0.1 to 10 parts of a diluent for each part of the reactant mixtures.

11. The process of claim 6 in which a catalytic amount of copper metal is added to the reaction mixture.

12. The process of claim 6 in which R is selected from the group consisting of methyl, ethyl, chloroethyl, propyl, isopropyl, butyl, isobutyl, amyl, isoamyl, hexyl, allyl and crotyl radicals.

13. A liquid polymeric phosphazene produced according to the process of claim 6.

14. The process of claim 6 in which said self-reaction is effected by heating said polymeric phosphazene with elimination of alkyl halide until the product has a viscosity up to 5,000 poises at 20° C, the product being self-condensed through the formation of P—O—P linkages.

15. The process of claim 14 wherein the alkyl halide is an alkyl chloride.

* * * * *

UNITED STATES PATENT OFFICE
CERTIFICATE OF CORRECTION

PATENT NO. : 3,994,996

DATED : November 30, 1976

INVENTOR(S) : Borivoj Richard Franko-Filipasic, Edward F. Orwoll and Vithal C. Patel It is certified that error appears in the above-identified patent and that said Letters Patent are hereby corrected as shown below:

Column 13, last line, Claim 6, "ether or amino-" should read --ether- or amino-substituted--

Signed and Sealed this

Nineteenth Day of April 1977

[SEAL]

Attest:

RUTH C. MASON
Attesting Officer

C. MARSHALL DANN
Commissioner of Patents and Trademarks